United States Patent [19]

Hoetzel

[11] Patent Number: 5,587,938
[45] Date of Patent: Dec. 24, 1996

[54] METHOD AND DEVICE FOR MANEUVERING A MOTOR VEHICLE OUT OF A PARKING SPACE

[75] Inventor: Juergen Hoetzel, Michelstadt, Germany

[73] Assignee: Robert Bosch GmbH

[21] Appl. No.: 593,593

[22] Filed: Jan. 29, 1996

Related U.S. Application Data

[63] Continuation of Ser. No. 289,355, Aug. 11, 1994, abandoned.

[30] Foreign Application Priority Data

Sep. 29, 1993 [DE] Germany ............................ 43 33 112.2

[51] Int. Cl.⁶ .................................................... G06F 7/70
[52] U.S. Cl. ................. 364/578; 364/443; 364/423.098; 340/932.2; 340/933
[58] Field of Search ............................ 364/578; 340/901, 340/904, 932.2, 933, 943, 424.01, 424.02; 395/88; 901/1

[56] References Cited

U.S. PATENT DOCUMENTS

| | | | |
|---|---|---|---|
| 4,626,850 | 12/1986 | Chey | 340/903 |
| 4,735,274 | 4/1988 | Good et al. | 180/204 |
| 4,888,713 | 12/1989 | Falk | 364/522 |
| 5,004,997 | 4/1991 | Shisgal et al. | 340/436 |
| 5,043,902 | 8/1991 | Yokoyama et al. | 364/449 |
| 5,059,946 | 10/1991 | Hollowbush | 340/435 |
| 5,101,436 | 3/1992 | De Aguiar et al. | 382/1 |
| 5,144,685 | 9/1992 | Nasar et al. | 382/48 |
| 5,160,927 | 11/1992 | Cherry et al. | 340/904 |
| 5,165,108 | 11/1992 | Asayama | 340/435 |
| 5,170,352 | 12/1992 | McTamaney et al. | 364/424.02 |
| 5,208,586 | 5/1993 | Friberg et al. | 340/932.2 |
| 5,212,467 | 5/1993 | Park | 340/435 |
| 5,214,408 | 5/1993 | Asayama | 340/435 |
| 5,218,414 | 6/1993 | Kajiwara | 356/1 |
| 5,257,023 | 10/1993 | Furuya | 340/995 |
| 5,339,075 | 8/1994 | Abst et al. | 340/903 |
| 5,347,273 | 9/1994 | Katiraie | 340/903 |
| 5,351,044 | 9/1994 | Mathur et al. | 340/901 |
| 5,357,438 | 10/1994 | Davidian | 364/461 |

FOREIGN PATENT DOCUMENTS

| | | |
|---|---|---|
| 2901504 | 6/1980 | Germany . |
| 4023538 | 1/1992 | Germany . |

OTHER PUBLICATIONS

Dunlay, "Obstacle Avoidance Perception Processing for the Autonomous Land Vehicle", Jan. 1988.
Asada, "Map Building for a Mobile Robot from Sensory Data", Nov. 1990.
Gupta, "A Hough Transform Based Approach to Polyline Approximation of Object Boundaries", Jul. 1992.

*Primary Examiner*—Emanuel T. Voeltz
*Assistant Examiner*—Patrick Assouad
*Attorney, Agent, or Firm*—Kenyon & Kenyon

[57] ABSTRACT

A method and a device for maneuvering a motor vehicle out of a parking space, in the case of which neither the size nor the clearance of obstacles is known. By means of sensors mounted on the motor vehicle, the clearance between the motor vehicle and surrounding obstacles and the position and steering angle of the motor vehicle are determined, and continuously updated. On the basis of this data, an up-to-date, local map of the surroundings is placed in a computer module. A polyline is used to connect the detected obstacles to form a barrier. From this data, a model of the surroundings is produced, with which a driving strategy for maneuvering the motor vehicle out of the parking space is determined. Driving-direction pointers indicate the appropriate driving direction to the driver of the motor vehicle.

6 Claims, 4 Drawing Sheets

5,587,938

METHOD AND DEVICE FOR MANEUVERING A MOTOR VEHICLE OUT OF A PARKING SPACE

This is a continuation of application Ser. No. 08/289,355 filed on Aug. 11, 1994, now abandoned.

FIELD OF THE INVENTION

The present invention relates to a method and device for maneuvering a motor vehicle out of a parking space.

BACKGROUND INFORMATION

German Printed Patent No. 29 01 504 explains that, in order to park in a parking space, one must first measure the length of the parking space when driving by, so that dependent upon the motor-vehicle's position and the length of the parking space, the motor vehicle can be parked with as few steering movements as possible. To the extent this is possible, no available parking space will remain unused and as many vehicles as possible can park.

However, such a parking method cannot be used for maneuvering a motor vehicle out of a parking space, since when one starts to maneuver a motor vehicle out of a parking space, the length of the parking space, i.e., the available path in front of and behind the motor vehicle to maneuver out of the space, is not known. Even storing the dimensions of the parking space measured during the parking operation does not solve this problem, since the size of the parking space can change while the vehicle is parked. Also, when one starts to maneuver a motor vehicle out of a parking space, neither the distance from the motor vehicle to adjacent motor vehicles and other obstacles, nor the width of those obstacles, is known and, thus, an optimal steering angle is unable to be determined.

Therefore, the strategy used during the parking operation—to park the motor vehicle as close as possible to the curbstone and utilize the smallest amount of parking space possible—cannot be applied when maneuvering a motor vehicle out of a parking space.

SUMMARY OF THE INVENTION

An advantage of the method and device according to the present invention is that, even when parking-space boundaries are not known, an initially incomplete model of the obstacle description can be created and a strategy for maneuvering a motor vehicle out of the parking space can be put together on the basis of this model.

It is especially advantageous that during the time that the motor vehicle is being maneuvered out of a parking space, the model of the surroundings is updated/completed by data signals from the sensors. This enables the driving strategy to be adapted continuously until the motor vehicle has been completely maneuvered out of the parking space. This is advantageously achieved in that a polygon is produced for the model of the surroundings by connecting the segmental edges of the obstacles in the resulting local map of the surroundings.

It is furthermore advantageous that in the case of a partial or incomplete description of obstacles in the model, the operation of maneuvering a motor vehicle out of a parking space is nonetheless started. In this manner, one avoids the time delays which would otherwise be required in order to complete the model of the surroundings.

It is also beneficial that the model of the surroundings is continually updated, since the clearance between the motor vehicle and other obstacles changes continuously with every movement of the motor vehicle.

It is also advantageous that an optical or acoustic display is produced, so that the driver can easily understand the information provided with regard to the steering movements to be executed.

To prevent a collision and to prevent the motor vehicle from driving too close to an obstacle, it is advantageous for a warning signal to be produced when the motor vehicle falls below a certain specified minimum clearance.

DETAILED DESCRIPTION OF THE DRAWINGS

Figure 1:
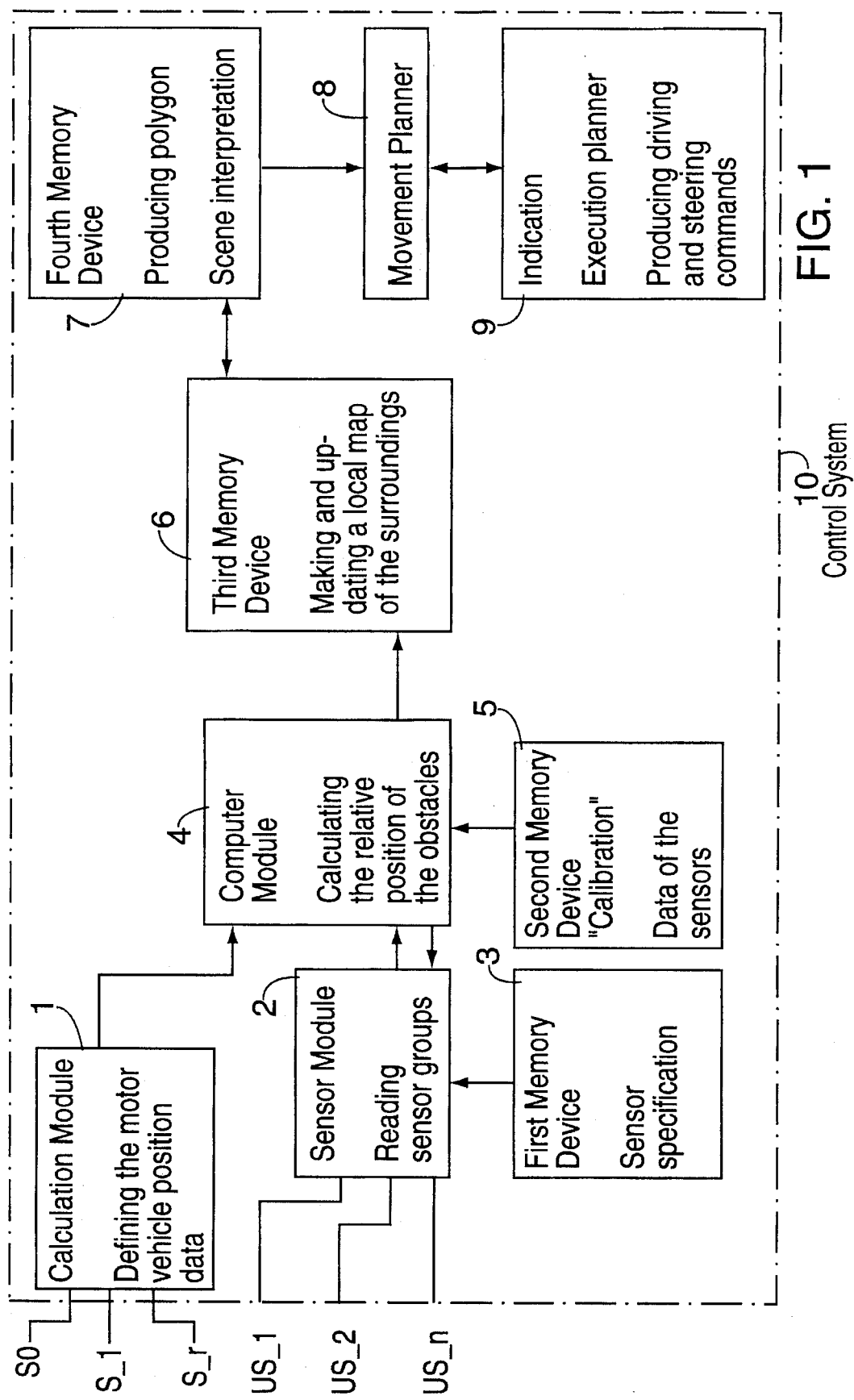
FIG. 1 shows a functional block diagram of the device according to the present invention for implementing the method according to the present invention.

FIG. 1 depicts a control system 10, in which several functional modules are shown in the form of a block diagram. A calculation module 1 for defining the motor-vehicle position is connected to one or more sensors S1, Sr, S0. These sensors are arranged, for example, on the left or right wheels and measure the motor-vehicle movement, as well as the steering angle θ.

The signals emitted by these sensors are evaluated in the calculation module 1 as the length of travel or driving angle θ of the motor vehicle, so that the instantaneous motor-vehicle position can be determined. To determine the instantaneous motor-vehicle position, one needs a minimum of two sensors which are independent of one another (for example, one wheel sensor and one steering angle sensor).

Furthermore, a sensor module 2 is provided, to whose inputs can be connected one or more of the ultrasonic sensors US1, US2, USn. The ultrasonic sensors are arranged on the front, side, and/or rear areas of the motor vehicle and are designed to detect obstacles around the motor vehicle. Besides ultrasonic sensors, any other sensors can be used, of course, with which contactless distance measurement is possible.

On the output side, the sensor module 2, in the same way as the calculation module 1, is connected to a computer module 4, which uses the incoming data to calculate the position of the obstacles relative to the motor vehicle. The sensor module 2 is linked to the first memory device 3, in which data sets for the sensor specification are stored. Stored in the second memory device 5 are calibration data for all sensors, which are used to calibrate the measured values from the computer module 4.

From the measured data, the computer module 4 first calculates an updated local map of the surroundings, which is filed in the third memory device 6. Subsequently, from the local map of the surroundings, the computer module 4 calculates a model of the surroundings, which is stored temporarily in a fourth memory device 7. From the map of the surroundings, a travel strategy for the motor vehicle is subsequently established in a movement planner 8, and appropriate travel signals are indicated optically or acoustically in an execution planner 9.

Figure 2:
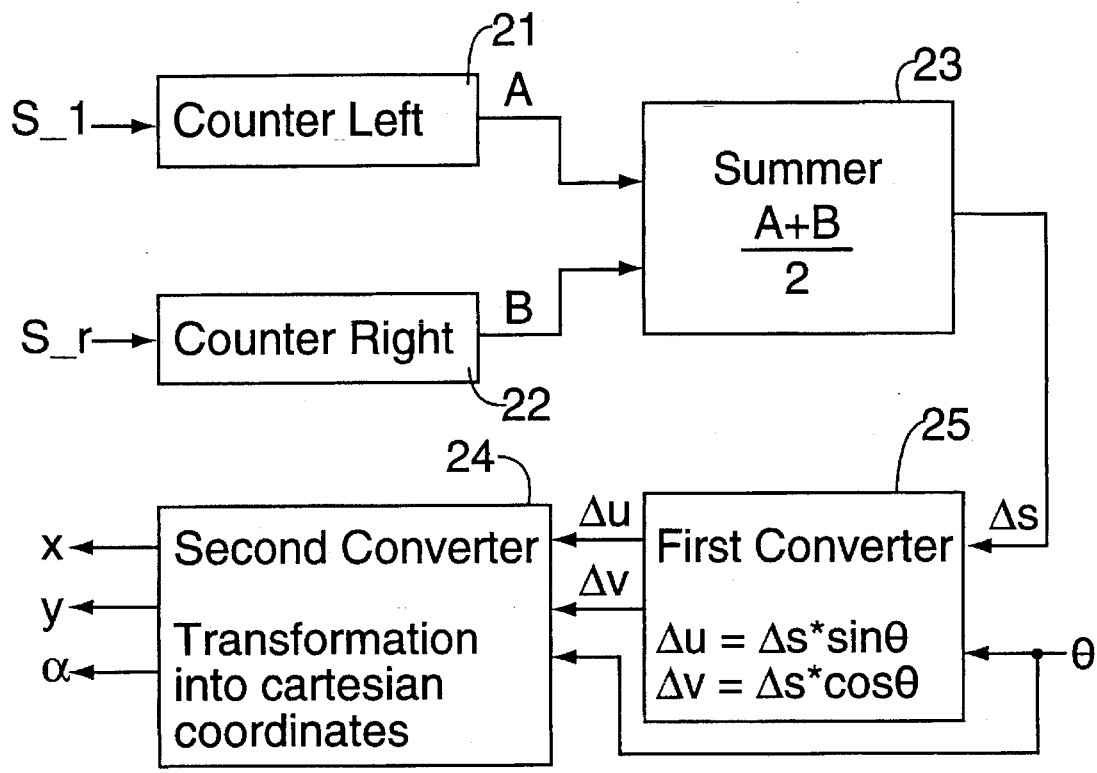
FIG. 2 shows a block diagram of the calculation module of FIG. 1.

FIG. 2 depicts a block diagram of a variant of an embodiment of the calculation module 1. Counters 21 and 22 are assigned to the two path sensors $S_l$ and $S_r$ for the left and right rear wheels, respectively, of the motor vehicle. The counters 21 and 22 count path pulses, which correspond to the length of travel covered by the motor vehicle. Corresponding calibrations for tire diameters and number of pulses per length of travel are filed in the second memory device 5, so that the counted pulses are directly proportional to the length of travel covered by the motor vehicle. The outputs of the counters A and B, respectively, are fed to a summer 23, which generates the average value $$\frac{A+B}{2}.$$

An integrated circuit currently being sold on the market, for example 74 LS 382, can be used as a summer 23. However, the calculation is preferably performed in the computer module 4, and the average value $\Delta S$ temporarily stored. Thus, the determined average value $\Delta S$ represents the change in the motor vehicle's position relative to its previous position.

In addition, the steering angle $\theta$ of the motor vehicle is measured directly or indirectly using an angular sensor $S\theta$, and this is likewise supplied to the first converter 25. To determine the steering angle $\theta$ of the motor vehicle, the angular sensor, $S\theta$, measures the steering angle of a wheel or the steering gear.

Figure 2A:
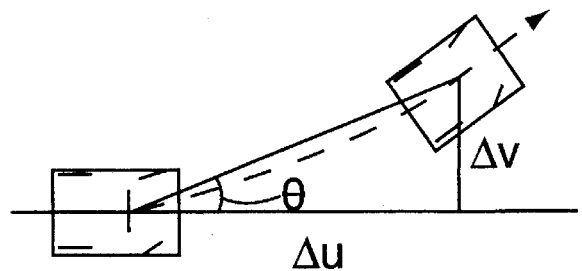
FIG. 2a shows a diagram for allocating the positional components of the distance covered by the motor vehicle.

From the steering angle $\theta$ and the average value $\Delta S$, the first converter 25 calculates the axis segments $\Delta u$ and $\Delta v$ for the new position of the motor vehicle in accordance with the equations $\Delta u=\Delta s \times \sin\theta$ and $\Delta v=\Delta s \times \cos\theta$ (FIG. 2a). The first converter 25 is preferably realized by a corresponding computational routine in accordance with the indicated formulae from the computer module 4.

The thus acquired data $\Delta u$, $\Delta v$, as well as the steering angle $\theta$ then are converted in a second converter 24 into the coordinates x, y of a cartesian coordinate system. The second converter 24 is likewise advantageously realized by the computer module 4. The current position of the motor vehicle is then entered with the values x, y, $\theta$ in the local map of the surroundings 6, which is temporarily stored in the third memory device 6.

FIG. 2a depicts a diagram for allocating the determined values $\Delta u$, $\Delta v$, and $\theta$ with respect to the distance covered by the motor vehicle.

Figure 3:
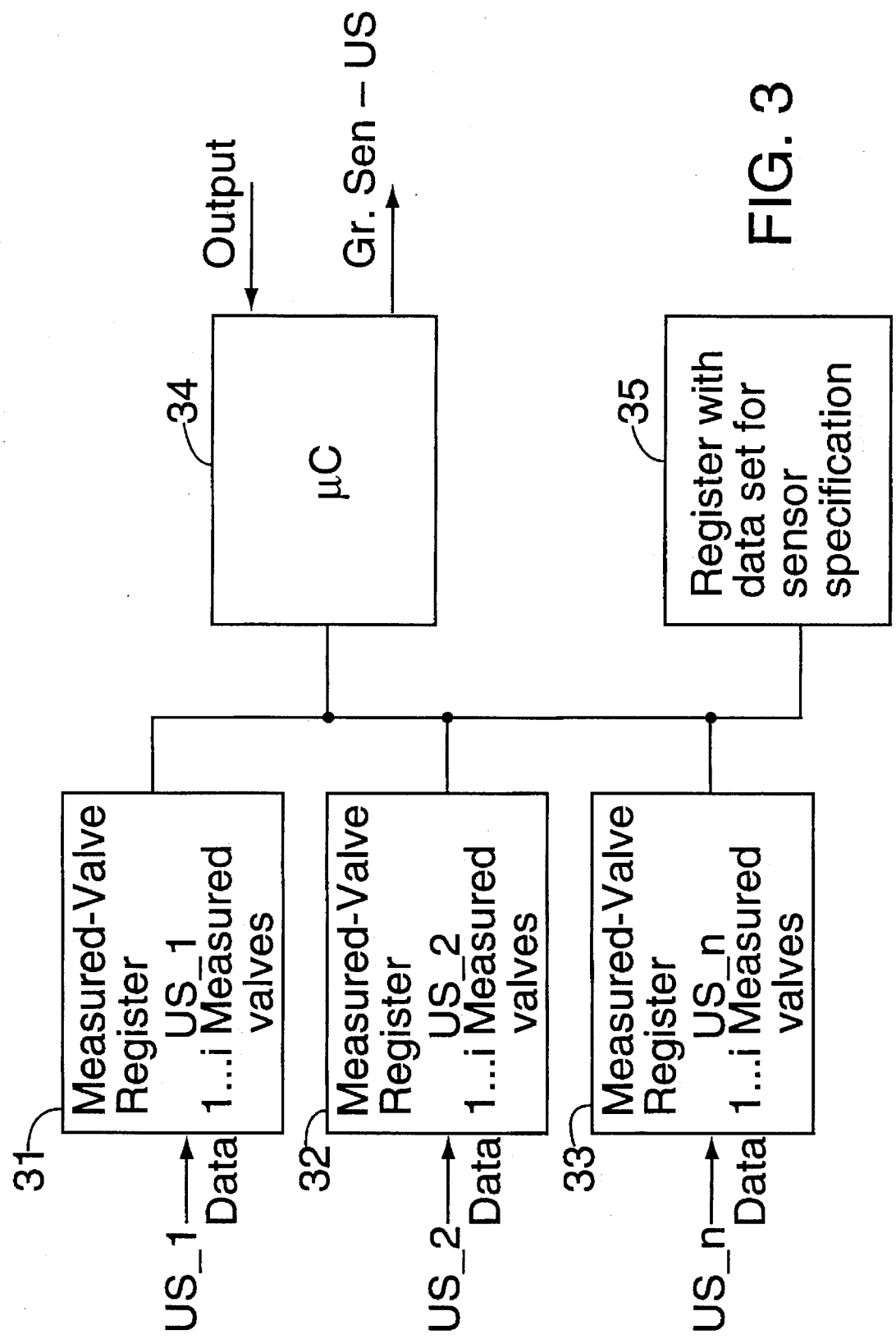
FIG. 3 shows a block diagram of the sensor module of FIG. 1.

FIG. 3 shows the schematic structure of the sensor module 2, to which is linked the ultrasonic sensors $US_1$, $US_2$ and $US_n$ via measured-value registers 31, 32, 33. The measured values of the sensors are continually read into the measured-value registers 31, 32, 33 and temporarily stored. A microcomputer 34, which is connected to the outputs of the measured-value registers 31, 32, 33, preselects the measured values of the individual measured-value registers 31, 32, 33 by means of a switching matrix (not shown) and, from these, calculates the clearance to one or more obstacles in the receiving range of the sensors.

In another refinement of the present invention, it is provided for the measured values to be checked with respect to the obstacles by means of repeated measurements and a plausibility check, for example using the cross measurement described in German Printed Patent No. 40 23 538. The microcomputer 34 is a component of the computer module 4 and can be used for the proposed computational operations, in particular to produce the local map of the surroundings including notation of the obstacles.

This is achieved in that the cartesian coordinates x, y, as well as $\theta$, which were transformed in accordance with the second converter 24, are used, on the one hand, to enter the position of the motor vehicle in the local map of the surroundings and, on the other hand, to mark the obstacles on the map of the surroundings in relation to the motor vehicle, and to store them in the third memory device 6. Thus, for every instant, a current local map of the surroundings is formed, from which the driving range of the motor vehicle can be used for the operation of maneuvering a motor vehicle out of a parking space.

Figure 4:
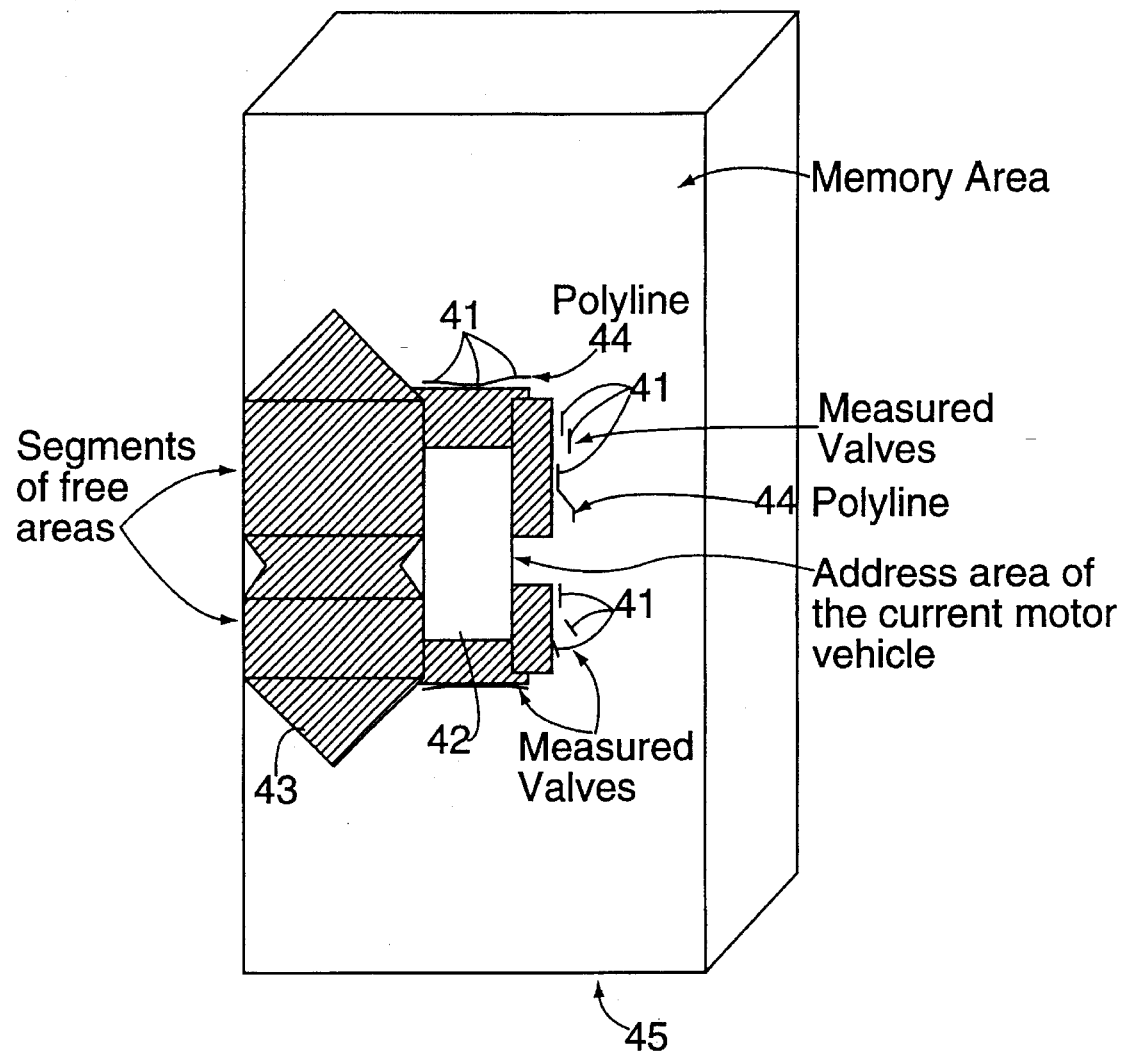
FIG. 4 shows a local map of the surroundings of a type generated according to the present invention.

FIG. 4 depicts an up-to-date local map of the surroundings of the third memory device 6, in which schematic obstacles 41 are arranged around a motor vehicle 42. This map is only shown schematically, since, naturally, only the addresses for the obstacles are stored in the third memory device 6. The motor vehicle 42 is surrounded on three sides by obstacles 41, while the fourth side shows a free area 43, into which the motor vehicle is maneuvered when it is moved out of a parking space.

The computer module 4 produces a model of the surroundings from the local map of the surroundings, which it temporarily stores in the fourth memory device 7. Since, in practice the obstacles surrounding the motor vehicle have a certain clearance from one another, but such clearance being so small that the motor vehicle can and must not drive between them, the model of the surroundings is obtained by linking the obstacles 41 (FIG. 4) with a polyline (a polygon line) 44, which is literally interpreted as a barrier for the motor vehicle. The polyline 44 between the obstacles 41, however, is drawn so as to be interrupted provided a specified minimum clearance exists between obstacles 41. This interruption can then be interpreted and utilized as a possible way to drive out.

With the method for maneuvering a motor vehicle out of a parking space according to the present invention, it is possible for the size or geometric dimensions of the parking space to be unknown. At the beginning of the operation of maneuvering out of a parking space, the sensors measure both the clearances to the obstacles, as well as the steering angle, and from this determine a possible driving curve for the vehicle driver to follow with the vehicle. The driving curve is preferably selected as a driving strategy by the motor vehicle operator so that the motor vehicle can be moved out of a parking space with as few steering movements and/or maneuvers as possible.

The driving curve the vehicle actually follows is automatically entered into the allocated map of the surroundings so that the stored data reveals whether the motor vehicle is on a collision course with an obstacle. The measured values for the clearance measurements and the driving angle are read, together with the corresponding correction values, into the computer module 4, and checked for plausibility. The correction values had been stored in tabular form beforehand by means of a measuring drive or through calibration in the first or second memory device 3, 5.

If the model of the surroundings is calculated by creating the polyline, then the computer module 4 can calculate a driving strategy on the basis of the existing data, which definitely enables the motor vehicle to be maneuvered out of a parking space in a collision-free manner. This operation is performed by the computer module 4 in a sequence of movements. However, since sensor data is continually supplied during the operation of maneuvering a motor vehicle out of a parking space, the driving strategy and, thus, the driving curve are constantly checked to determine if they are up-to-date and, if need be, adapted.

On the basis of the driving strategy of the movement planner 8, driving-direction arrows can be displayed for the driver to follow. For example, if an arrow indicates a direction to the left, the driver must steer further to the left. Correspondingly, if an arrow indicates a direction to the right, the driver must steer further to the right. An arrow pointing straight ahead indicates that he can drive straight ahead and a stop symbol indicates that he must stop driving to avoid a collision. In place of an optical indication, an acoustic indication can also be provided, which produces an appropriate signal or voice alert.

The warning indicators and/or arrows are provided to devise a driving strategy that ensures that the motor vehicle adheres to a specified minimum safety clearance during the operation of maneuvering a motor vehicle out of a parking space. This can be permanently programmed or be customized to the driving habits of a driver.

What is claimed is:

1. A method for maneuvering a vehicle out of a parking space, comprising the steps of:
   measuring, with at least one sensor mounted on the vehicle, a clearance of an obstacle in a driving direction of the vehicle;
   producing a local map of a surrounding area of the vehicle as a function of the measured clearance and motor vehicle position data;
   producing a model of the surrounding area as a function of the local map;
   determining, in an open-loop control system coupled to the at least one sensor, a driving strategy for maneuvering the vehicle out of the parking space as a function of the model; and
   displaying, for a driver of the vehicle, information indicative of the driving strategy for maneuvering the vehicle out of the parking space.

2. The method according to claim 1, further comprising the step of updating, while maneuvering the vehicle out of the parking space, the model of the surrounding area as a function of the motor vehicle position data and data signals emitted by the at least one sensor such that a polyline is produced for the model of the surrounding area as a function of connections between segmental edges of detected obstacles.

3. The method according to claim 2, further comprising the step of adapting, in the control system, the driving strategy as a function of the updated model of the surrounding area from a start of maneuvering until an end of maneuvering the vehicle out of the parking space.

4. The method according to claim 1, wherein the vehicle is started to be maneuvered out of the parking space in the case of an incomplete description of obstacles in the model.

5. A device for maneuvering a motor vehicle out of a parking space, comprising:
   at least one sensor to detect an obstacle relative to a position of the vehicle;
   an open-loop control system coupled to the at least one sensor for producing a local map of a surrounding area of the vehicle as a function of the detected obstacle and vehicle position data, for producing a model of the surrounding area as a function of the local map, and for determining a driving strategy for maneuvering the vehicle out of the parking space as a function of the model; and
   a display device coupled to the open-loop control system for displaying, for a driver of the vehicle, information indicative of the driving strategy.

6. The device according to claim 5, wherein the information indicative of the driving strategy includes at least one of an optical warning signal and an acoustic warning signal provided to the driver when a clearance between the vehicle and the obstacle falls below a minimum value.

* * * * *